US006773069B1

(12) United States Patent
Kaneko et al.

(10) Patent No.: US 6,773,069 B1
(45) Date of Patent: Aug. 10, 2004

(54) VEHICLE SEAT

(75) Inventors: Yoshinobu Kaneko, Tochigi-ken (JP); Masami Yoshida, Tochigi-ken (JP)

(73) Assignee: TS Tech Co., Ltd., Saitama-ken (JP)

( * ) Notice: Subject to any disclaimer, the term of this patent is extended or adjusted under 35 U.S.C. 154(b) by 40 days.

(21) Appl. No.: 10/111,973

(22) PCT Filed: Aug. 31, 2000

(86) PCT No.: PCT/JP00/05893

§ 371 (c)(1),
(2), (4) Date: Apr. 30, 2002

(87) PCT Pub. No.: WO02/17753

PCT Pub. Date: Mar. 7, 2002

(51) Int. Cl.[7] ................................................. A47C 1/02
(52) U.S. Cl. ............................. 297/344.17; 297/344.15; 297/452.52
(58) Field of Search ........................ 297/344.15, 344.17, 297/452.52; 248/421

(56) References Cited

U.S. PATENT DOCUMENTS

| | | | | |
|---|---|---|---|---|
| 2,942,647 | A | * | 6/1960 | Pickles |
| 4,556,185 | A | * | 12/1985 | Takagi |
| 4,767,157 | A | * | 8/1988 | Kazaoka et al. |
| 4,778,139 | A | * | 10/1988 | Babbs |
| 6,276,650 | B1 | * | 8/2001 | Kojima et al. |
| 6,290,198 | B1 | * | 9/2001 | Kojima et al. |
| 6,425,557 | B1 | * | 7/2002 | Becker et al. |
| 6,488,337 | B1 | * | 12/2002 | De Voss et al. |

FOREIGN PATENT DOCUMENTS

| | | |
|---|---|---|
| JP | 56-28716 A | 3/1981 |
| JP | 61-200040 A | 9/1986 |
| JP | 2-236032 A | 9/1990 |
| JP | 79745/1991 U | 8/1991 |
| JP | 37026/1992 U | 3/1992 |
| JP | 6-156126 A | 6/1994 |
| JP | 9-301025 A | 11/1997 |
| JP | 2000-300380 A | 10/2000 |
| JP | 2000-300381 A | 10/2000 |
| JP | 2000-300382 A | 10/2000 |
| JP | 2000-309237 A | 11/2000 |
| JP | 2000-309240 A | 11/2000 |

* cited by examiner

*Primary Examiner*—Milton Nelson, Jr.
(74) *Attorney, Agent, or Firm*—Browdy and Neimark, P.L.L.C.

(57) ABSTRACT

The present vehicle seat has a framework 14, a plurality of zigzag springs 25, 25 attached between side frame member 17, 17 of the framework 14, and a height control mechanism 38 moving the framework 14 up and down relative to a vehicle body. The spring tip end 26 of each of the springs 25 is arranged at a position adjacent to the center line which vertically divides the side member 17, so that the distance between the spring tip end 26 and the center line is shorter than the distance between the spring tip end 26 and the upper edge 30 of the side member 17. Arms 51, 52 and an elongated link 53 of the height control mechanism 38 are arranged outside the side member 17.

22 Claims, 16 Drawing Sheets

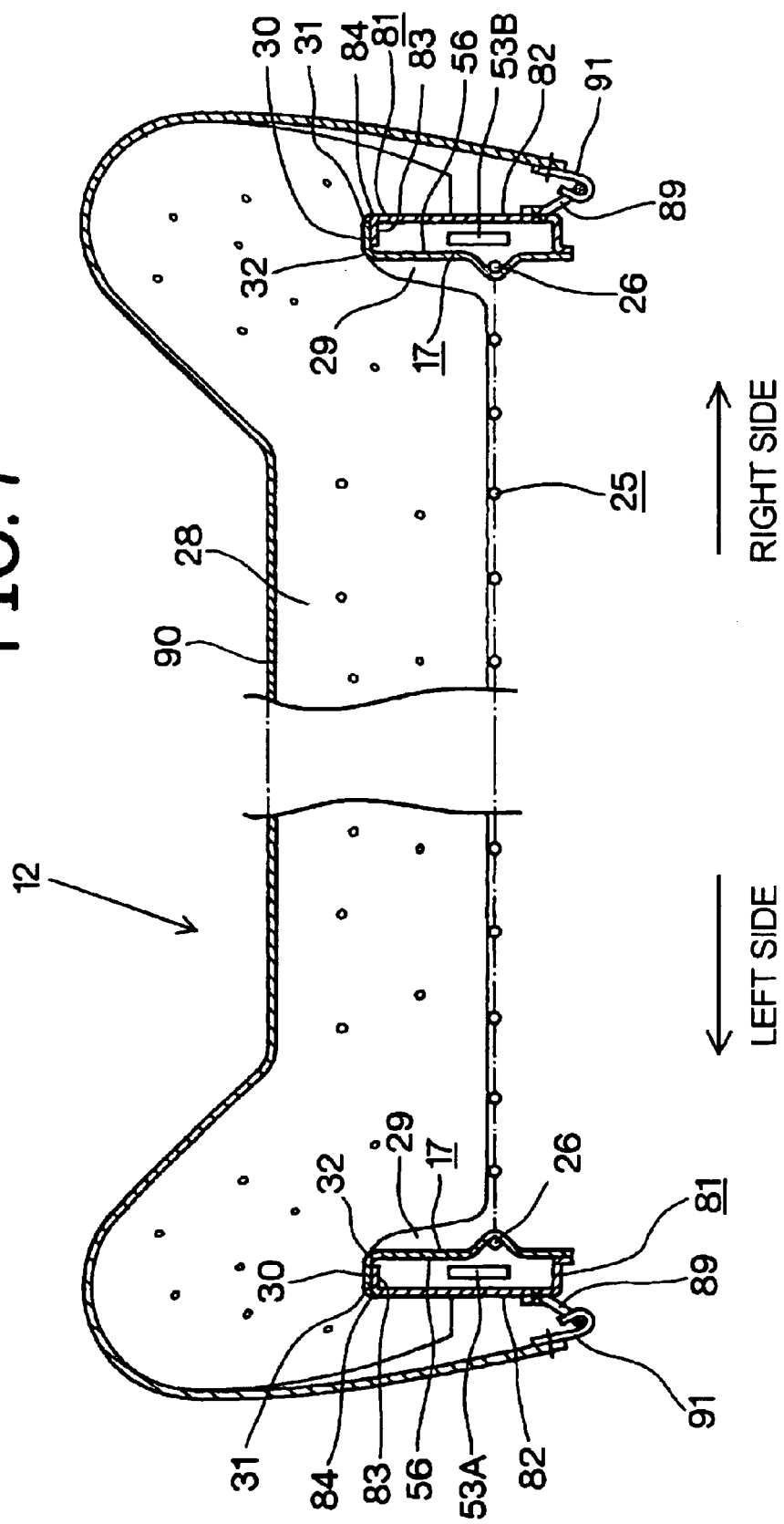

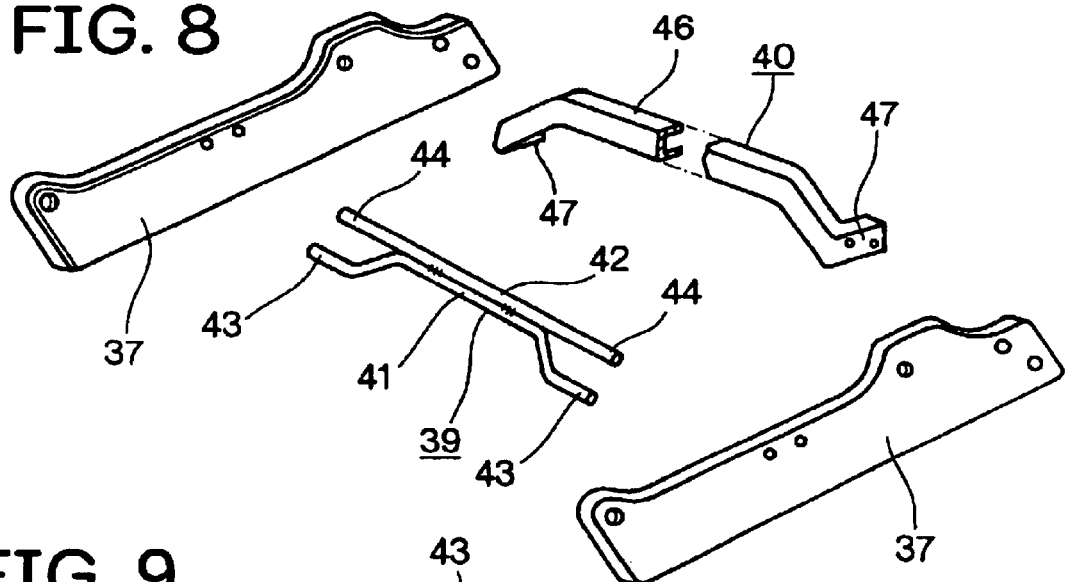
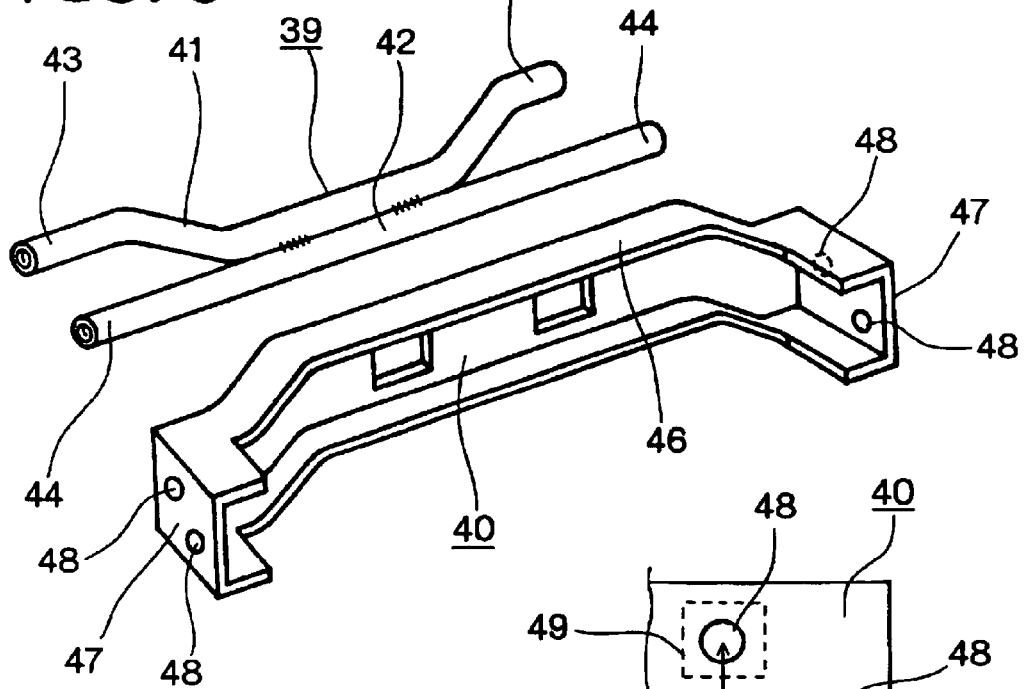
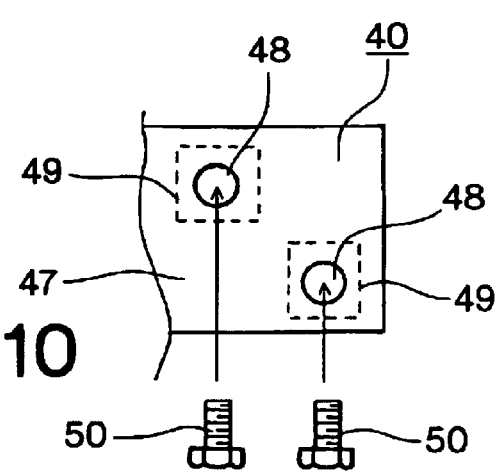

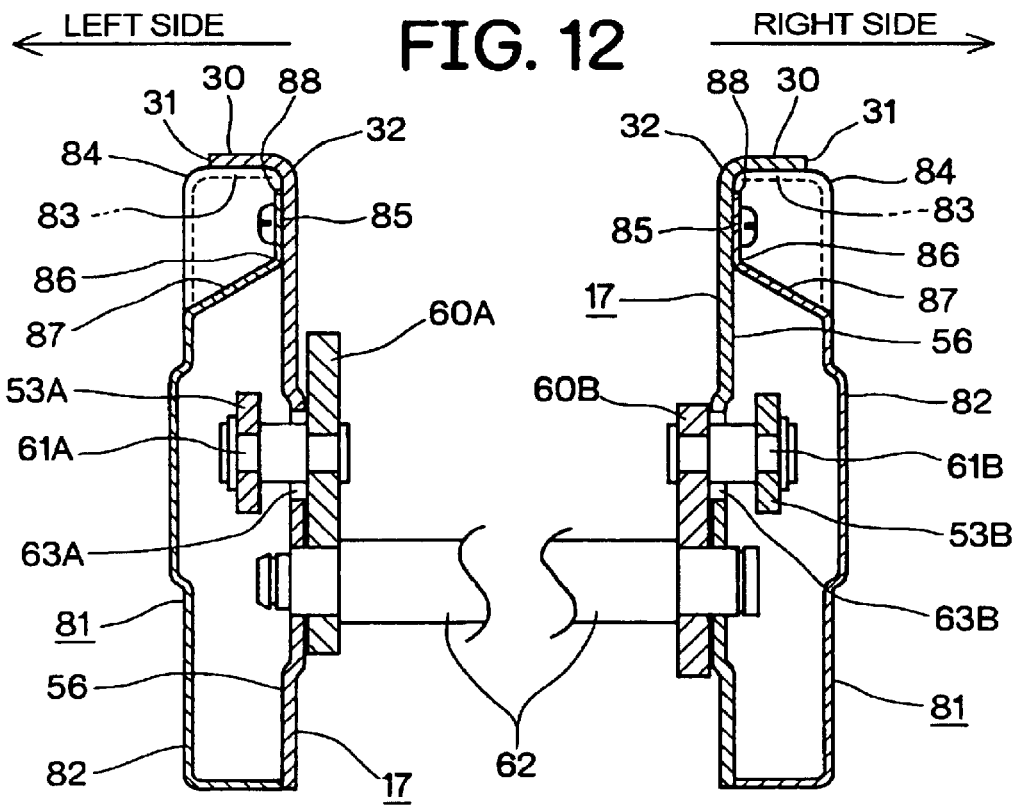
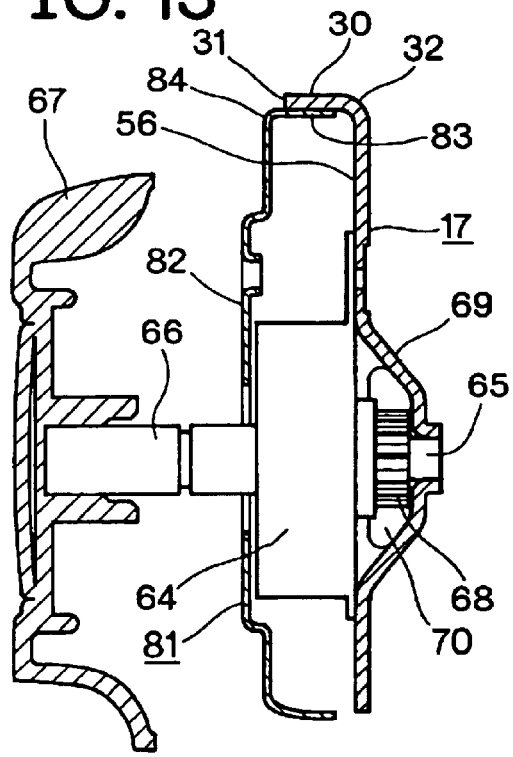
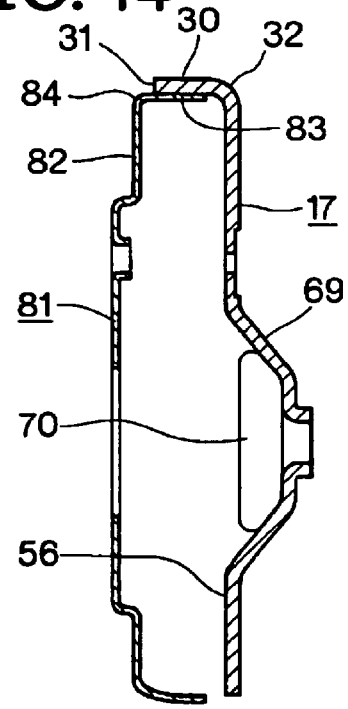

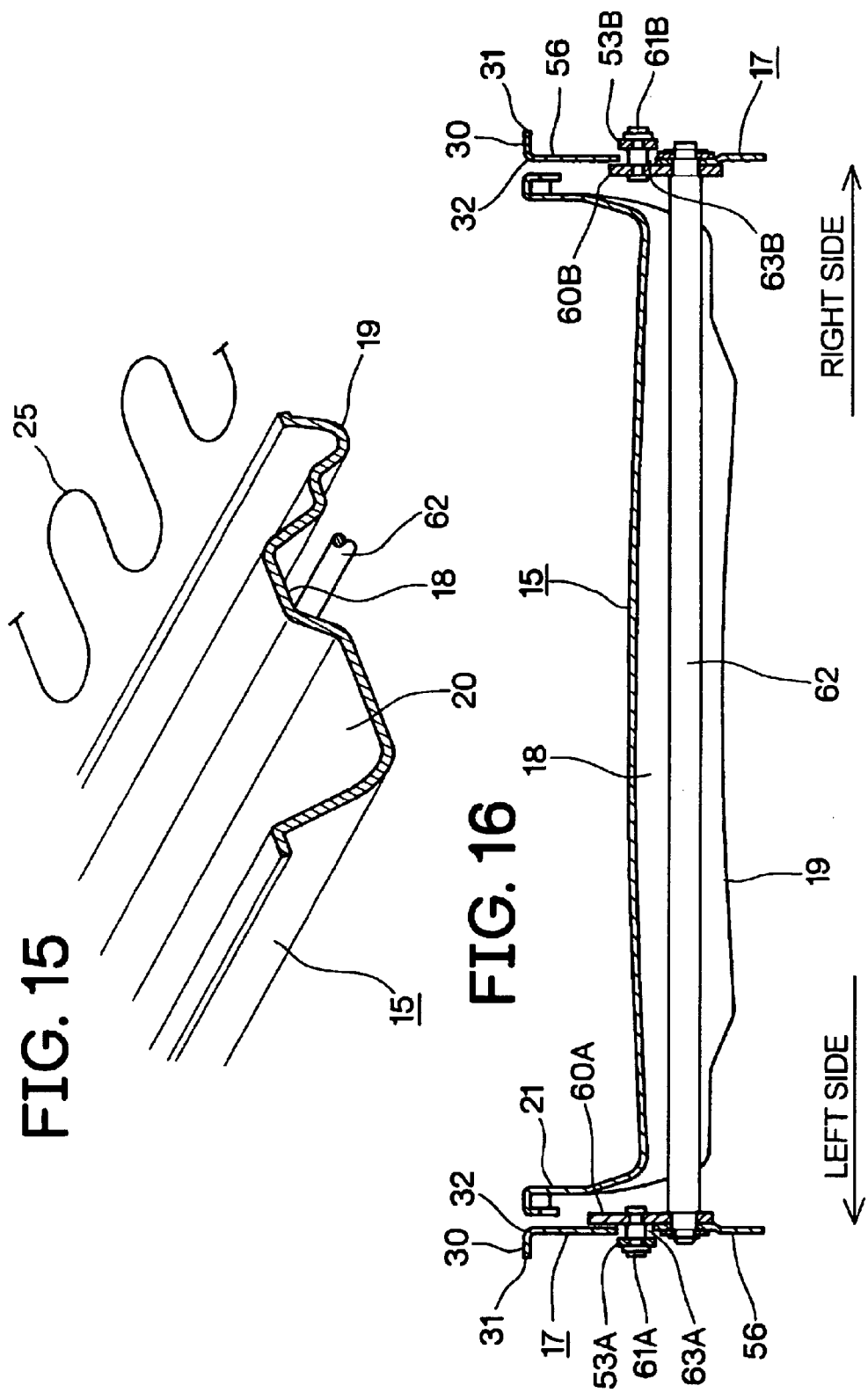

FIG. 20
FIG. 21
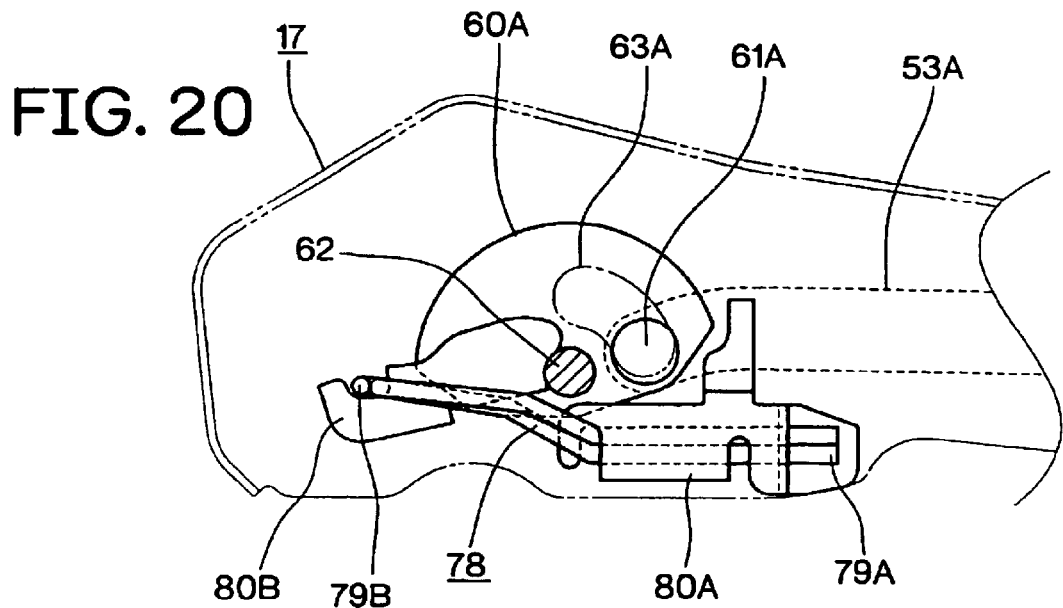
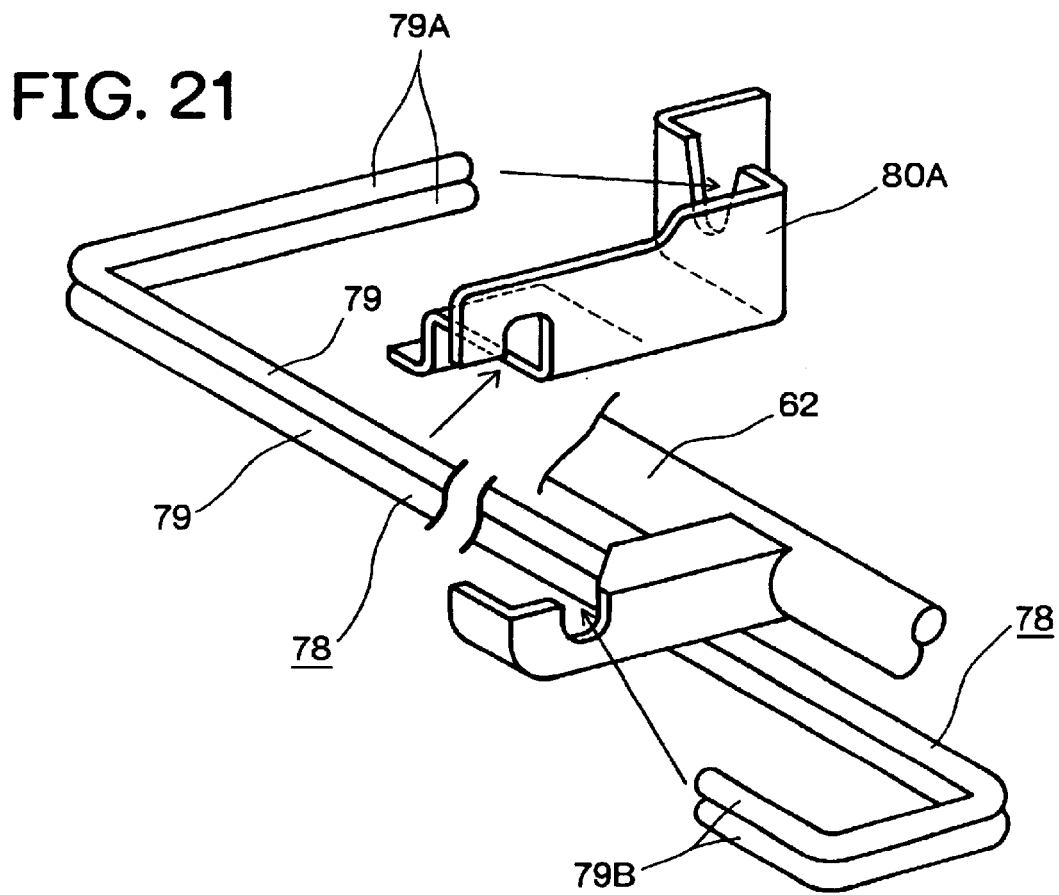

VEHICLE SEAT

TECHNICAL FIELD OF THE INVENTION

The present invention relates to a vehicle seat, and more particularly, relates to the frame structure of a seat bottom of a vehicle seat.

BACKGROUND ART OF THE INVENTION

As a prior art, Japanese Utility Model Application Laid-Open No. 5-35458 discloses a seat bottom of a vehicle seat, which comprises: a framework including a pair of left and right side frame members extending in the back-and-forth direction, a front frame member fixed between front portions of the side frame members, and a rear frame member fixed between rear portions of the side frame members; a plurality of zigzag springs positioned between the front frame member and the rear frame member, and having spring tip ends attached at the middle portion between the front portion and the rear portion of the side frame member; a cushion attached on the framework with the springs; and a height control mechanism moving the framework up and down relative to a vehicle body.

The prior art has such a disadvantage that the thickness in the vertical direction of the seat bottom is thick. It will be described below. As shown in FIGS. 23 and 24, the framework 100 of the prior art has a bracket 102 fixed to a bottom 101 of the framework 100, and the bracket 102 is connected to a slide rail 104 by way of a height control mechanism 103. The height control mechanism 103 has a leg portion 105 fixed to the bracket 102, an arm 107 connected to the tip of the leg portion 105 by a shaft 106, an interlocking shaft 108 to which the base portion of the arm 107 is fixed, an operating dial 109, an output gear 110 arranged to be rotated by the operating dial 109, and a sector gear 111 meshed with the output gear 110 and fixed to the interlocking shaft 108. The dial 109 is supported by a bracket 112 of the slide rail 104.

In the case of the prior art with the above structure, the framework 100 has the integrally fixed bracket 102, and therefore, the vertical height of the framework 100 is shown by H. Therefore, the zigzag spring 113 is positioned at a higher position of the framework 100, and the position of the cushion that is mounted on the spring 113 also inevitably becomes high, so that the thickness in the vertical direction of the seat bottom is increased.

Furthermore, in the case of the prior art, the fact that almost all members of the height control mechanism 103 are provided at positions lower than the upper end of the bracket 112 of the slide rail 104 is also the reason why the vertical thickness of the seat bottom is increased.

BRIEF SUMMARY OF THE INVENTION

It is an object of the present invention to provide an improved vehicle seat that overcomes the disadvantage of the prior art.

In order to achieve this object, a vehicle seat is provided, which comprises: a framework composed of a pair of left and right side frame members that extend in the back-and-forth direction, a front frame member that has left and right side plates fixed to the front portions of the side frame members, and a rear frame member that has left and right side plates fixed to the rear portions of the side frame members; a plurality of zigzag springs that are positioned between the front frame member and the rear frame member, and have spring tip ends attached at the middle portion between the front portion and the rear portion of the side frame member; and a height control mechanism that moves the framework up and down relative to the vehicle body, and which is characterized in that each of the spring tip ends is arranged at a position near the center line vertically dividing the side frame member, and the distance between the spring tip end and the center line is made shorter than the distance between the spring tip end and the upper edge of the side frame member.

BRIEF DESCRIPTION OF THE DRAWINGS

FIG. 7 is a vertical cross sectional front view of the seat bottom;

FIG. 8 is an exploded illustration of spacers to be attached to the seat bottom and front and rear connecting members;

FIG. 9 is an enlarged illustration of the connecting members;

FIG. 10 is a partial enlarged view of the rear connecting member;

FIG. 12 is a vertical cross sectional front view showing a sector gear of a height control mechanism of the seat bottom and an interlocking lever;

FIG. 13 is a vertical cross sectional front view of a reduction gear mechanism and an operating dial of the height control mechanism;

FIG. 14 is a vertical cross sectional front view of the left side frame and a frame cover;

FIG. 15 is an enlarged illustration of a front frame member of the framework and a zigzag spring;

FIG. 16 is a vertical cross sectional front view showing a reinforcing upward rib and a reinforcing downward rib of the front frame member;

FIG. 20 is a right side view showing the state of attaching of the torsion bar spring;

FIG. 21 is a partially cut-off illustration showing the state of attaching of the torsion bar spring;

BEST MODE FOR CARRYING OUT THE INVENTION

Figure 3:
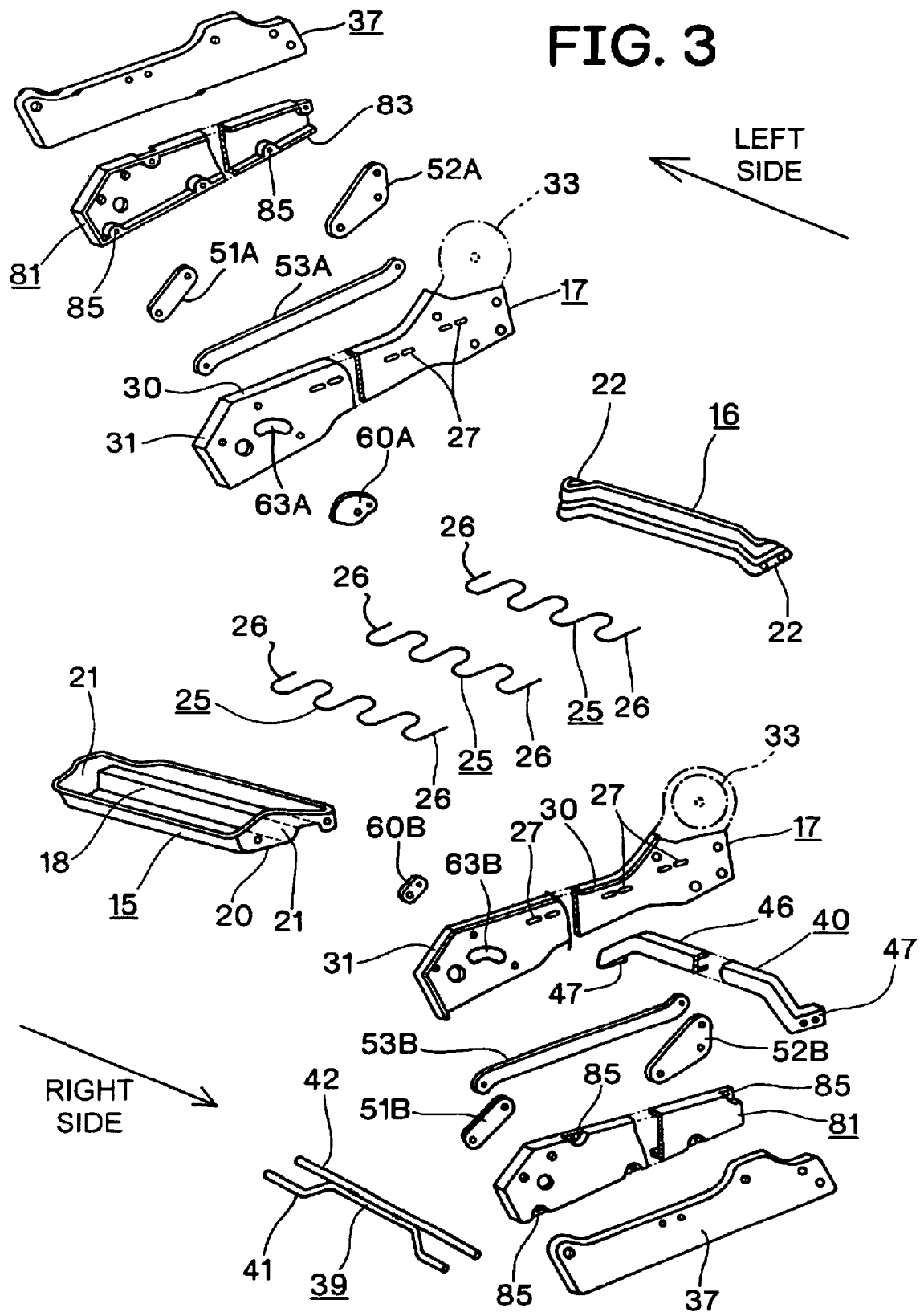
FIG. 3 is an exploded illustration of the framework and other members.
Figure 4:
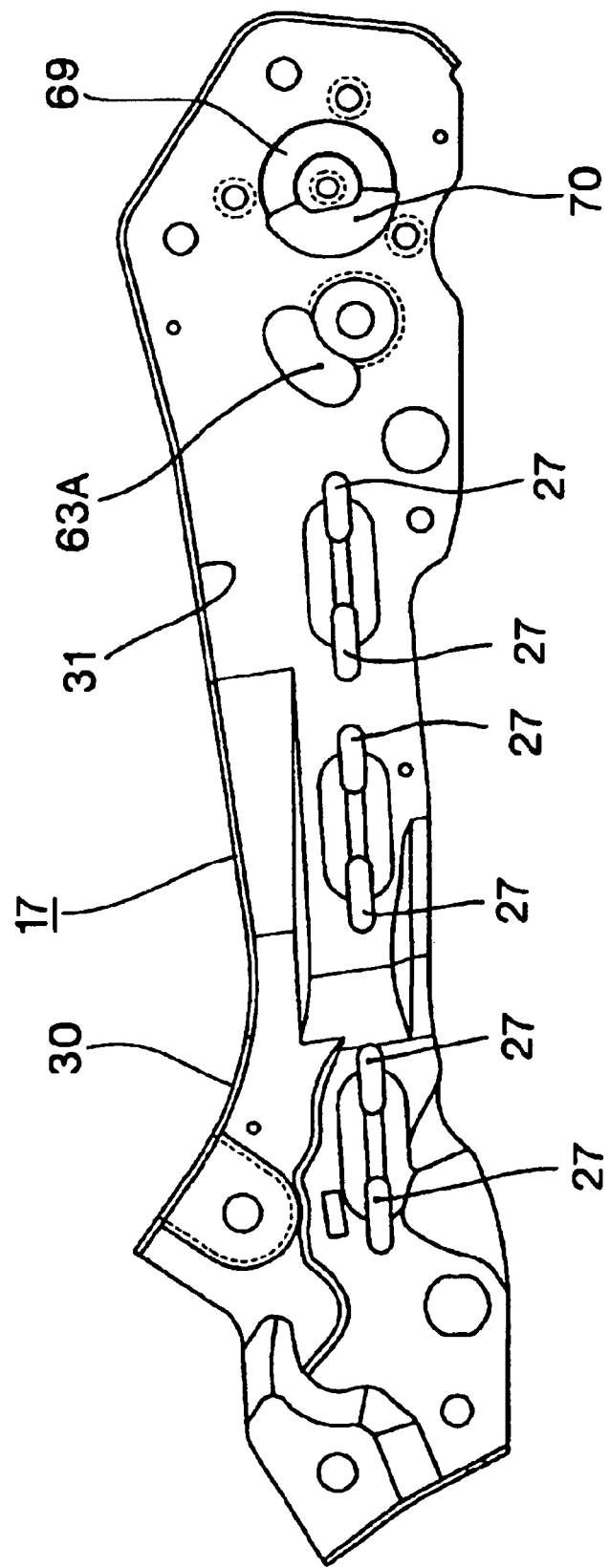
FIG. 4 is a left side view of a left side frame member of the framework.

One mode of the present invention will be described by referring to drawings. The vehicle seat 10 according to the present invention includes a seat bottom 12 which is slidably attached to a vehicle body 11 and a seat back 13 which is rotatably supported by the seat bottom 12. The seat bottom 12 has a framework 14 which is rectangular in the plan view, and as shown in FIG. 3, the framework 14 is substantially composed of a front frame member 15, a rear frame member 16, and upright side frame members 17, 17 extending in the back-and-forth direction of the seat 10.

The front frame member 15 is a laterally elongated rectangular pan-shaped frame, and as shown well in FIG. 15, has a corrugated bottom plate 20 with a laterally extending reinforcing upward rib 18 and a laterally extending reinforcing downward rib 19, and upright side plates 21, 21. As shown in FIG. 16, the downward rib 19 is provided at the middle portion except for the left side portion and the right side portion of the bottom plate 20, and is positioned at the rear side of the upward rib 18. The side plates 21, 21 are fixed to the front portions of the side members 17, 17 by bolt-nut means, welding means or the like, respectively.

Side plates 22, 22 of the rear member 16 are fixed to rear portions of the side members 17, 17 with bolts 23, 24, respectively. Between middle portions, a plurality of laterally extending zigzag springs 25, 25 are provided. Tip ends 26, 26 of the springs 25, 25 are engaged with a plurality of mounting holes 27, 27 formed in the middle portions of the side members 17, 17, respectively.

Figure 5:
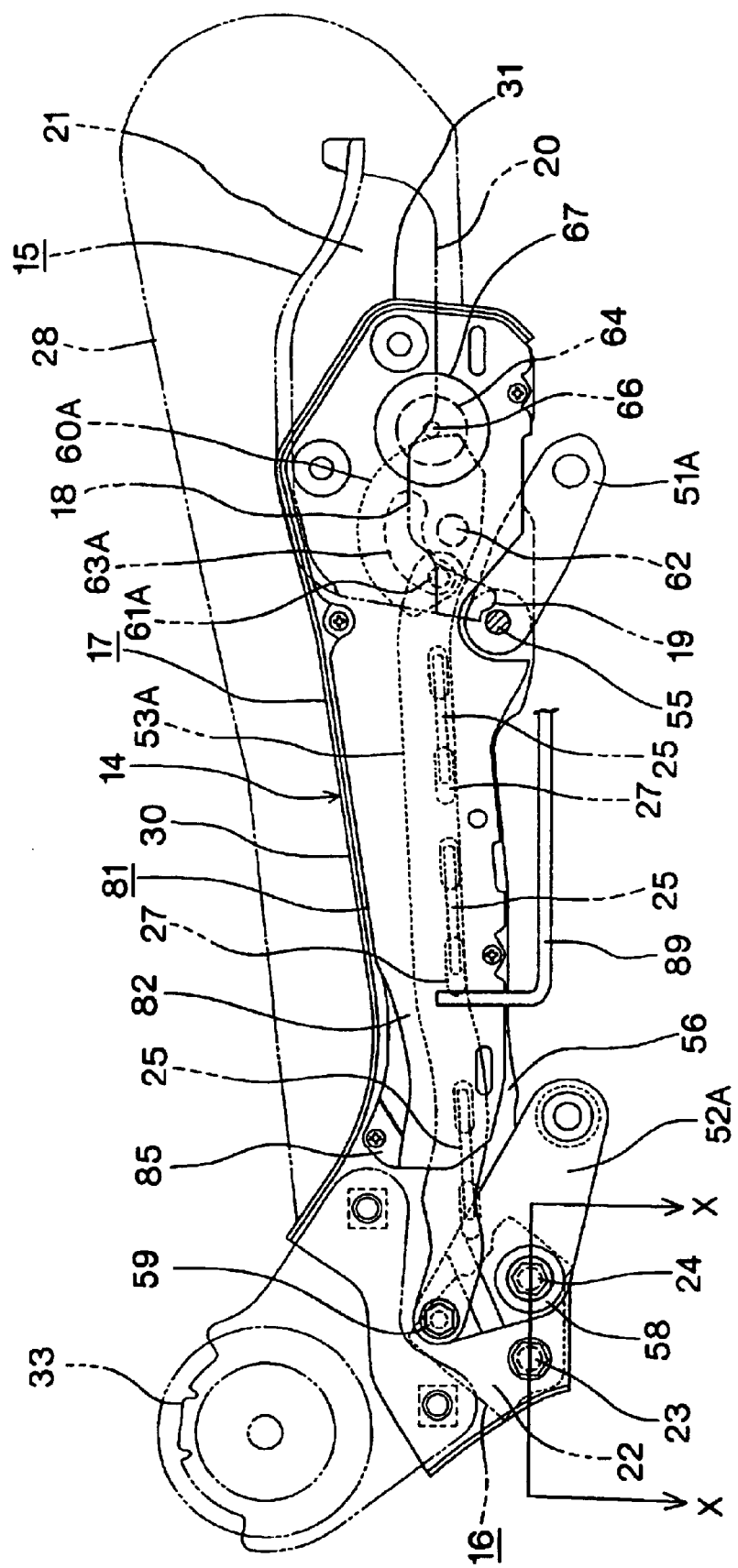
FIG. 5 is a left side view showing the framework and a cushion mounted on the framework.
Figure 6:
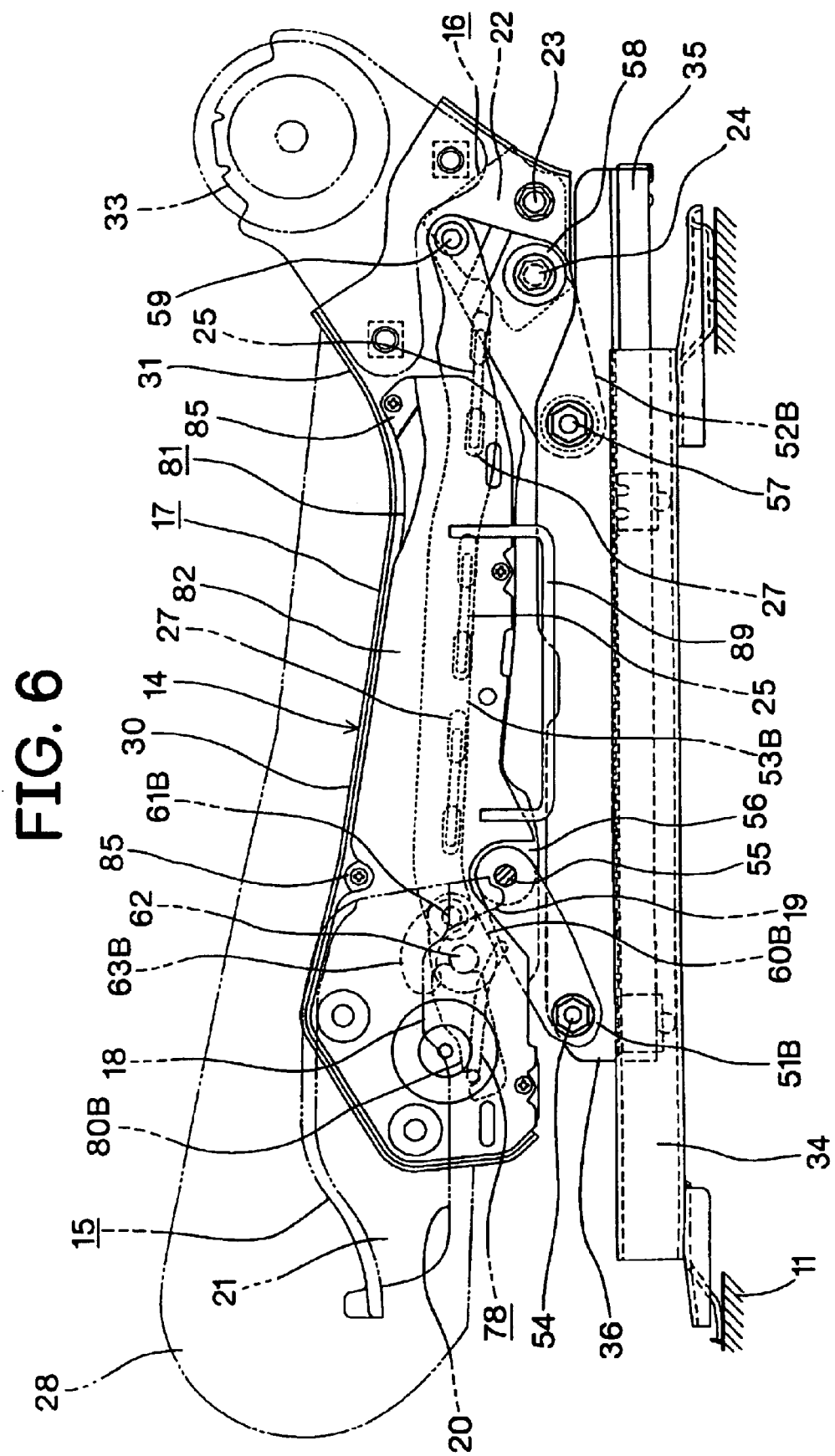
FIG. 6 is a right side view showing the framework and the cushion mounted on the framework.

The springs 25, 25 are arranged between the front member 15 and the rear member 16 as shown in FIGS. 5 to 7. Each of the mounting holes 27 is arranged at a position adjacent to the center line vertically dividing the side frame member 17, or a position under the center line. It is desired that the springs 25, 25 and the bottom plate 20 of the front member 15 have approximately the same height. On the framework 14 with the springs 25, 25, a cushion 28 made of urethane or the like is attached. In the present invention, in the interior 29 of the middle portion of each of the side members 17, as is clear from FIG. 7, no movable member of a height control mechanism is provided, which may cause damage to the cushion 28. Therefore, it becomes possible that each of the springs 25 is separated from the upper edge 30 of the side member 17 to lower the position of the cushion 28. This construction brings such an advantage that the height of the seat bottom 12 can be lowered without thinning the cushion 28 on the springs 25, 25, which supports the hip of a driver or a passenger. Accordingly, the hip of the driver is comfortably supported by the excellent cushioning performance of the springs 25, 25 and the cushion 28.

An outwardly extending flange 31 is integrally provided on at least upper and front edges of each of the side members 17 with which the cushion 2B comes into contact. A base portion of the flange 31 is formed to have a gently curved corner 32 for preventing damages from being given to the cushion 28. The rear portion of each of the side members 17 is fixedly provided with a supporting portion 33 to which the seat back 13 is attached.

As clear from FIG. 5, the length in the back-and-forth direction of the bottom plate 20 of the front frame member 15 is longer than the vertical length of the upright side plate 21 of the front member 15, and furthermore, it is equal to or longer than the thickness of the cushion 28. The front member 15 is positioned under the femoral region of the driver or the passenger. The front member 15 has no substantial elasticity, and the femoral region is elastically supported only by the cushioning of the cushion 28. The front portion of the seat bottom 12 does not require a great amount of elasticity, and therefore, the comfortability of the front portion of the seat bottom 12 can sufficiently be ensured only by the cushion of the cushion 28. The pan-shaped corrugated front member 15 has no elasticity, but instead of that, it has a high rigidity. The high rigidity of the front member 15 resists the so-called "submarine phenomenon" where the driver sinks down in the front downward direction at the time of a vehicle accident or the like, and keeps the driver at the normal position. Furthermore, the high rigidity of the front member 15 makes it unnecessary to provide a reinforcing member that connects the middle portions of the side members 17, 17 to each other.

As mentioned above, the framework 14 with the springs 25, 25 has a basic ability for providing a high rigidity and a sufficient comfortability to the seat bottom 12. Furthermore, the framework 14 with the springs 25, 25 has no heavy structural member at the portion surrounded by four members 15, 16, 17 and 17, and therefore, it can be manufactured to be light weight. Furthermore, each of the springs 25 is separated from the upper edge 30 of the side member 17, and therefore, the seat bottom 12 can be made thin without damaging the comfortability.

In the present invention, the tip end 26 of each of the springs 25 is arranged at a position adjacent to the center line of the side frame member 17. This means that the change of the shape or profile of the upper edge 30 of the side member 17 has no effect on the elasticity produced by the springs 25, 25, and means that the shape of the upper edge 30 can be designed while neglecting the cushioning performance of the seat bottom 12. Accordingly, in the present invention, the shape of the upper edge 30 can be designed while aiming at the holding performance and the performance of getting on and off that are required to the seat bottom 12. Generally, a high upper edge 30 brings a high holding performance and a low performance of getting on and off. In the case of the design where the cushioning performance can substantially be neglected, both the holding performance and the performance of getting on and off that are antinomic to each other can be achieved at a high grade.

Figure 1:
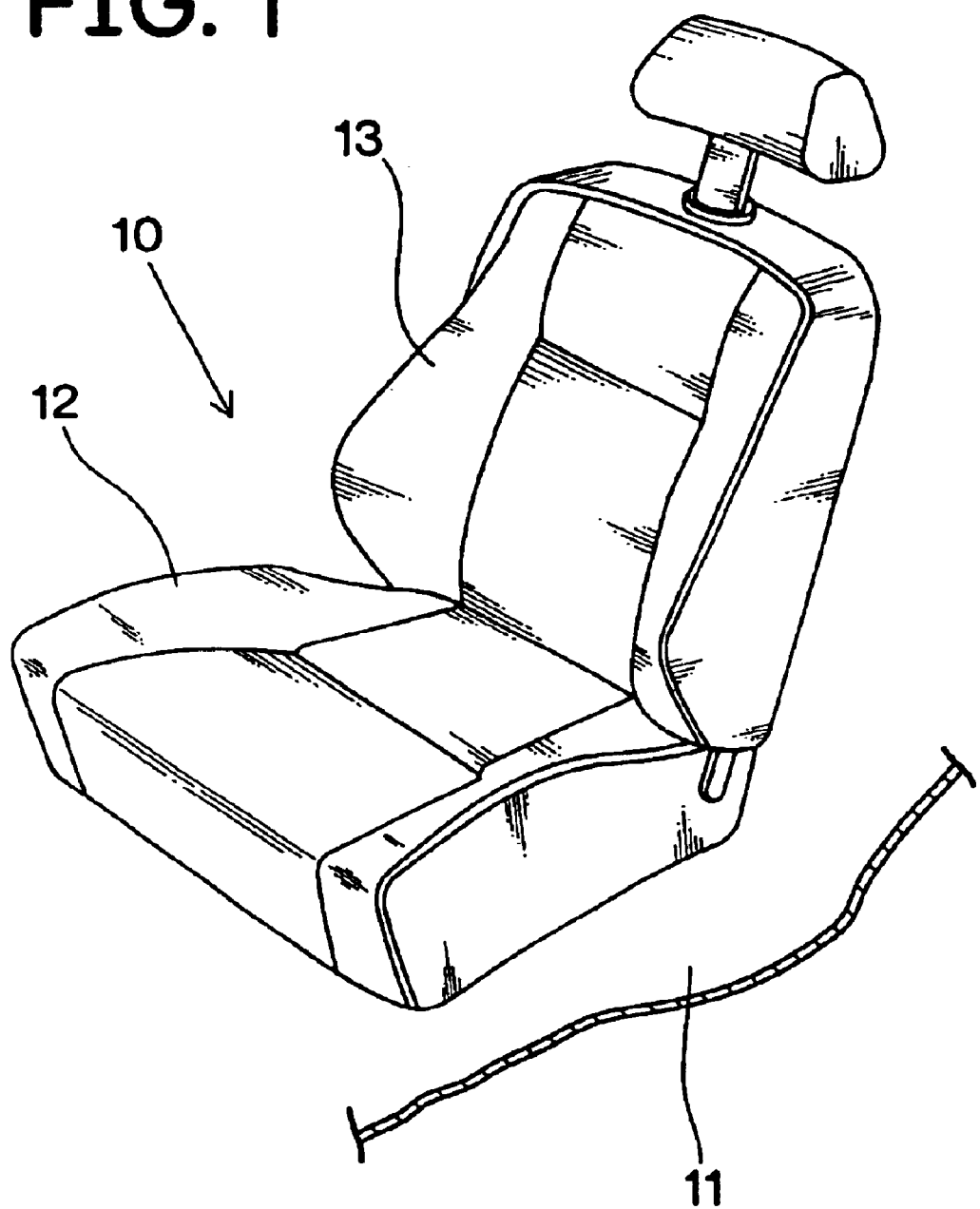
FIG. 1 is a perspective view of a vehicle seat according to the present invention.
Figure 2:
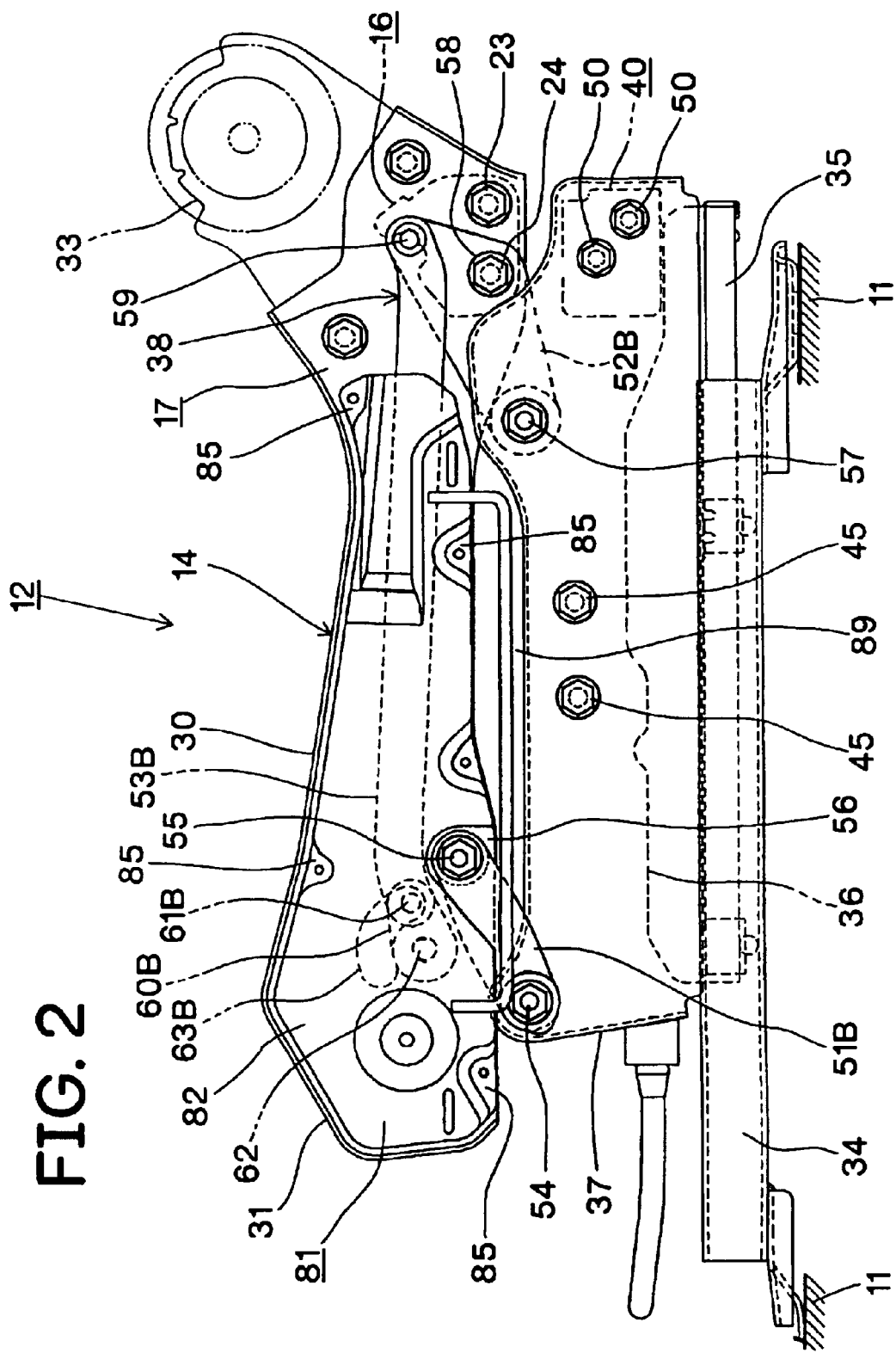
FIG. 2 is a right side view of a framework of a seat bottom of the vehicle seat attached to a vehicle body.

In FIG. 2, the vehicle seat 10 has a pair of lower rails 34 fixed to the vehicle body 11 and upper rails 35 slidably attached to the respective lower rails 34. Spacer 37 is fixed to an upright bracket 36 of each of the upper rails 35, and the framework 14 is attached to the spacers 37, 37 through the height control mechanism 38. The spacers 37 are used when necessary. In the case of a vehicle such as a sports car, the spacers 37 become unnecessary, and as shown in FIG. 6, the framework 14 is directly attached to the brackets 36 through the height control mechanism 38.

As shown in FIG. 8, the spacers 37, 37 are fixed to each other by a central connecting member 39 and a rear connecting member 40. The central connecting member 39 is composed of two metal rods 41, 42 that are fixed to each other at the central portions by welding. Tip ends 43, 43 of the rod 41 and tip ends 44, 44 of the rod 42 are separated from each other in the back-and-forth direction. The central member 39 has such an advantage that a comparatively light weight and a comparatively high rigidity are both provided. The tip ends 43, 44 preferably have an inside screw thread, and are fixed to the spacers 37, 37 with bolts 45, 45 (FIG. 2), respectively.

The rear connecting member 40 is composed of a laterally extending upwardly arched bridge 46 and bent portions 47, 47 which are angled to extend backward from both sides of the bridge 46. As shown in FIG. 10, the respective bent portions 47 have weld nuts 49, 49 fitted to holes 48, 48 formed in the bent portions 47, and are fixed to the spacers 37, 37 with bolts 50, 50. The bolts 50, 50 and the nuts 49, 49 are arranged along a straight line of about 45 degrees. The bolts 50, 50 which have the relation of inclination are provided with the function of a diagonal beam, and strongly resists against a force in any direction. Therefore, the bent portion 47 can be firmly fixed to the spacer 37 only by two bolts 50, 50.

The middle portions of the spacers 37, 37 are fixed to each other firmly by the high rigidity of the central connecting member 39, and the rear portions of the spacers 37, 37 are firmly fixed to each other by the rear connecting member 40. Therefore, as long as there arises no unusual situation, it is unnecessary to provide a member for connecting the front portions of the spacers 37, 37. The bridge 46 which bulges upward makes it easy to use the wide space under the seat bottom 12 which is made by the spacers 37, 37. For example, the passenger who sits on the rear seat can easily put the feet into the space from the lower side of the bridge 46.

As shown in FIGS. 2, 3 and 5, the height control mechanism 38 has a pair of front arms 51A, 51B, a pair of rear arms 52A, 52B, and a pair of elongated links 53A, 53B that are extending in the back-and-forth direction. Each lower end of the front arms 51A, 51B is rotatably attached to the spacer 37 with a lower bolt 54, and each upper end of the front arms 51A, 51B is rotatably attached to an outside surface 56 of the side frame member 17 with an upper bolt 55. Each lower end of the rear arms 52A, 52B is rotatably attached to the spacer 37 with a lower bolt 57, and each central portion of the rear arms 52A, 52B is rotatably attached to the outside surface 56 of the side member 17 with a fastener 58, and upper ends of the rear arms 52A, 52B are rotatably connected to rear ends of the elongated links 53A, 53B with upper bolts 59, respectively. When the links 53A, 53B moves in the back-and-forth direction, the arms 51A, 51B, 52A and 52B rotate about the lower bolts 54, 57, and the seat bottom 12 substantially moves in the vertical direction. Four arms and two links are positioned outside the side frame members 17, 17, respectively, and therefore, they do not interfere with the cushion 28.

Figure 11:
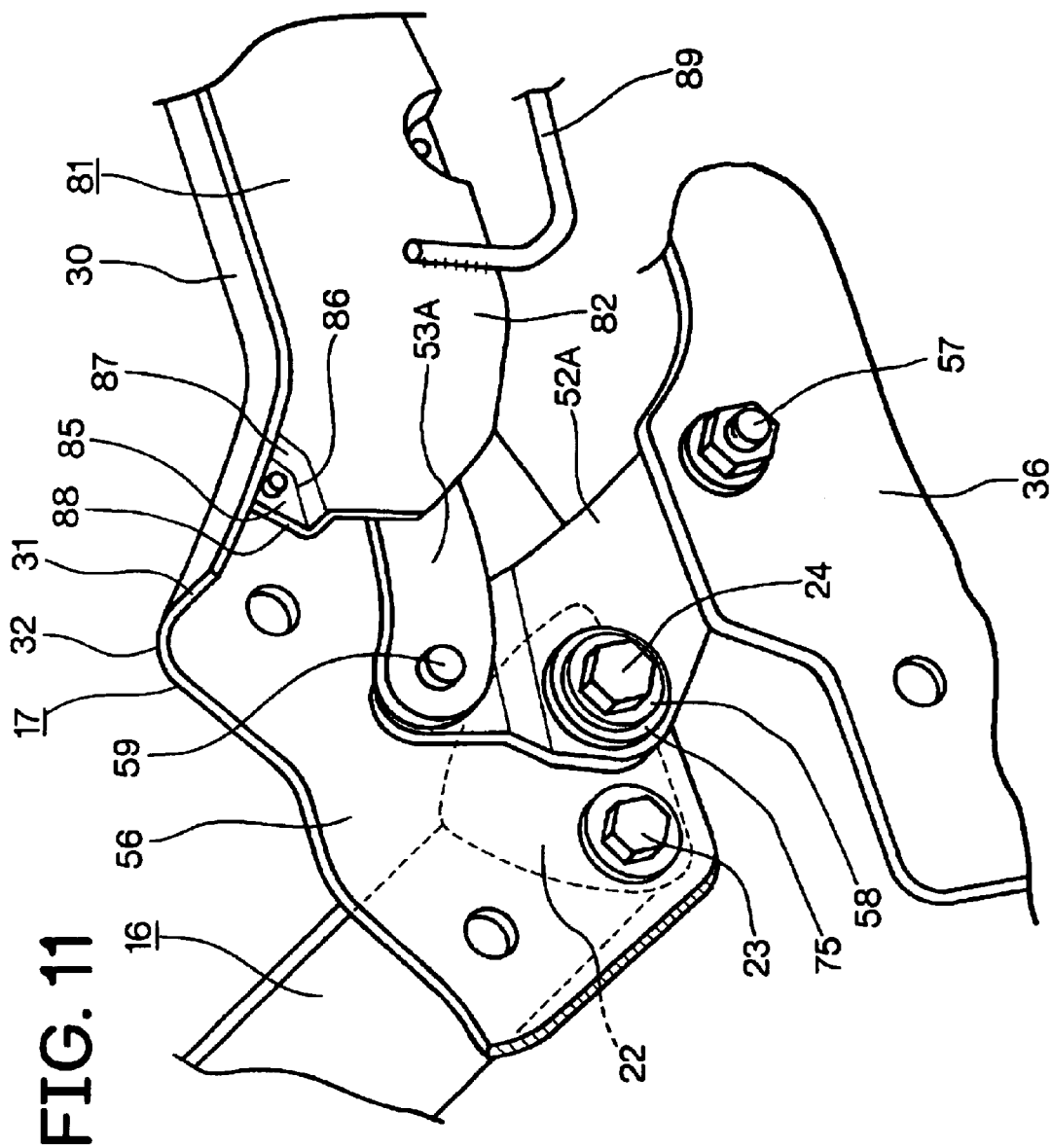
FIG. 11 is an enlarged illustration of the left side rear portion of the framework.

As shown in FIGS. 5, 6 and 11, the elongated links 53A, 53B are extending in the back-and-forth direction outside the side frame members 17, 17, respectively. The front end of the left link 53A is connected to a sector gear 60A with a connecting pin 61A as shown in FIGS. 12, 20. The sector gear 60A is positioned between the left side member 17 and the left side plate 21 of the front frame member 15 as shown in FIG. 16. The sector gear 60A is fixed, as shown in FIG. 12, to the left portion of a lateral interlocking shaft 62 which is rotatably provided between the side members 17, 17. The connecting pin 61A passes through a left circular arc slot 63A formed in the left side member 17, for connecting the left link 53A positioned outside the left side member 17 and the sector gear 60A positioned inside the left side member 17. The rotation of the sector gear 60A brings the rotation of the interlocking shaft 62 and the movement in the back-and-forth direction of the left link 53A. The sector gear 60A is positioned between the left side member 17 and the front member 15, and therefore, it can be arranged at a position of the same height as the side member 17 without interfering with the cushion 28.

As shown in FIGS. 6 and 12, the front end of the right link 53B is connected to an interlocking lever 60B with a connecting pin 61B. The interlocking lever 60B is positioned between the right side member 17 and the right side plate 21 of the front frame member 15, and is fixed to the right portion of the interlocking shaft 62. The connecting pin 61B passes through a right circular arc slot 63B formed in the right side member 17, for connecting the right link 53B positioned outside the right side member 17 and the interlocking lever 60B positioned inside the right side member 17. When the interlocking shaft 62 is rotated by the rotation of the sector gear 60A, the right link 53B is moved in the back-and-forth direction through the interlocking lever 60B. The interlocking lever 60B is positioned between the right side member 17 and the front frame member 15, and therefore, it can be arranged at a position of the same height as the side member 17 without interfering with the cushion 28.

The sector gear 60A and the interlocking lever 60B are arranged inside the side members 17, 17, respectively, and therefore, it is possible to fix the sector gear 60A and the interlocking lever 60B to the interlocking shaft 62 by welding means or the like before attaching the interlocking shaft 62 to the side members 17, 17. As shown in FIGS. 15 and 16, the interlocking shaft 62 is laterally extending by using the lower space formed by the reinforcing upward rib 18 of the front frame member 15. This increases the degree of freedom of the attaching position of the interlocking shaft 62 and the front frame member 15. Furthermore, the reinforcing downward rib 19 of the front member 15 also has the function for preventing the cushion 28 mounted on the framework 14 from overrunning toward the interlocking shaft 62.

As shown in FIGS. 5 and 13, a reduction gear mechanism or brake mechanism 64 is provided outside the front portion of the left side member 17. The reduction gear mechanism 64 has an output shaft 65 projecting to the inside or to the right and an input shaft 66 projecting to the outside or to the left. An operating dial 67 of the height control mechanism 38 is fixed to the outer end of the input shaft 66, and an output gear 68 is fixed to the output shaft 65. The output gear 68 is contained in a concave portion 69 formed in the left side member 17 to be positioned outside the left side member 17. The sector gear 60A is meshed with the output gear 68 through a window 70 formed in the rear peripheral wall of the concave portion 69. The rotation of the dial 67 is transmitted to the sector gear 60A through the reduction gear mechanism 64, and consequently, the elongated links 53A, 53B move in the back-and-forth direction at the same time to control the height of the seat bottom 12. Furthermore, because of the braking function of the reduction gear mechanism 64, it does not occur for the output gear 68 to rotate by the external force received from the sector gear 60A. Furthermore, it is also possible to rotate the output gear 68 by using an electric motor instead of the operating dial 67.

The output gear 68 of the reduction gear mechanism 64 is positioned outside the side member 17. Therefore, it is possible to attach the output gear 68 to the output shaft 65 of the reduction gear mechanism 64 in advance. Furthermore, the front side of the output gear 68 is surrounded by the front peripheral wall of the concave portion 69, and therefore, it is possible to prevent goods or the like contained under the seat bottom 12 from coming into contact with the output gear 68.

Figure 17:
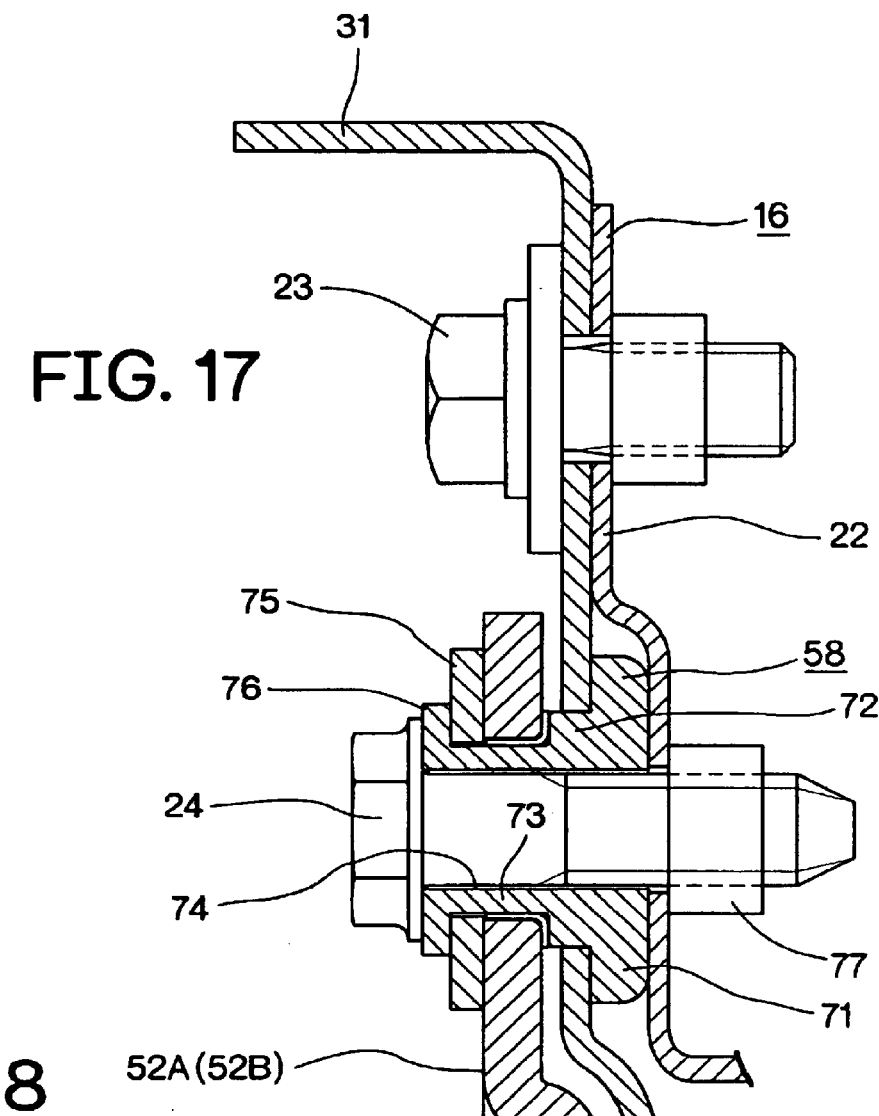
FIG. 17 is the X—X cross sectional view in FIG. 5.
Figure 18:
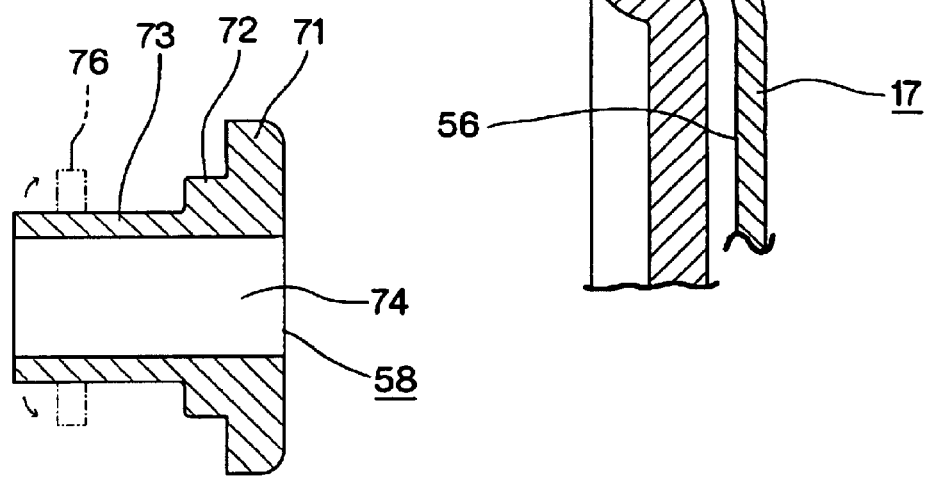
FIG. 18 is a cross sectional view of a shaft sleeve by which an arm of the height control mechanism is attached to the side frame member.

As shown in FIGS. 17, 18, the fastener 58 for attaching the rear arm 52A (52B) to the side frame member 17 comprises a stepped shaft sleeve. The sleeve 58 has a first head portion 71 formed at the tip end in advance, a large diameter body 72 which rotatably supports the side member 17, a small diameter body 73 which rotatably supports the rear arm 52A, and a central through hole 74. After attaching the side member 17, the rear arm 52A, and a washer 75 to the fastener 58, a second head portion 76 is formed by caulking work at the tip of the fastener 58. After attaching the rear arm 52A to the side member 17 with the fastener 58 rotatably, the bolt 24 is inserted into the through hole 74 to be screwed into a nut 77 welded to the side plate 22 of the rear frame member 16, thereby the rear frame member 16 is fixed to the side member 17.

As mentioned above, when three comparatively large and heavy members are connected or fixed by using the shaft sleeve 58 and the bolt 24, several excellent advantages can be obtained. A first advantage is that the assembly of each member becomes easy. When assembling three large members only by one bolt, it becomes a very difficult work to align three holes which a re formed in the respect iv e members. A second advantage is that it is possible to prevent the lowering of strength of each member. If a first member and a second member are fixed by a first bolt, and after that, the first member and a third member are fixed by a second bolt, it is necessary to form two holes through which two bolts pass, in the first member. The two holes lower the strength of the first member.

Figure 19:
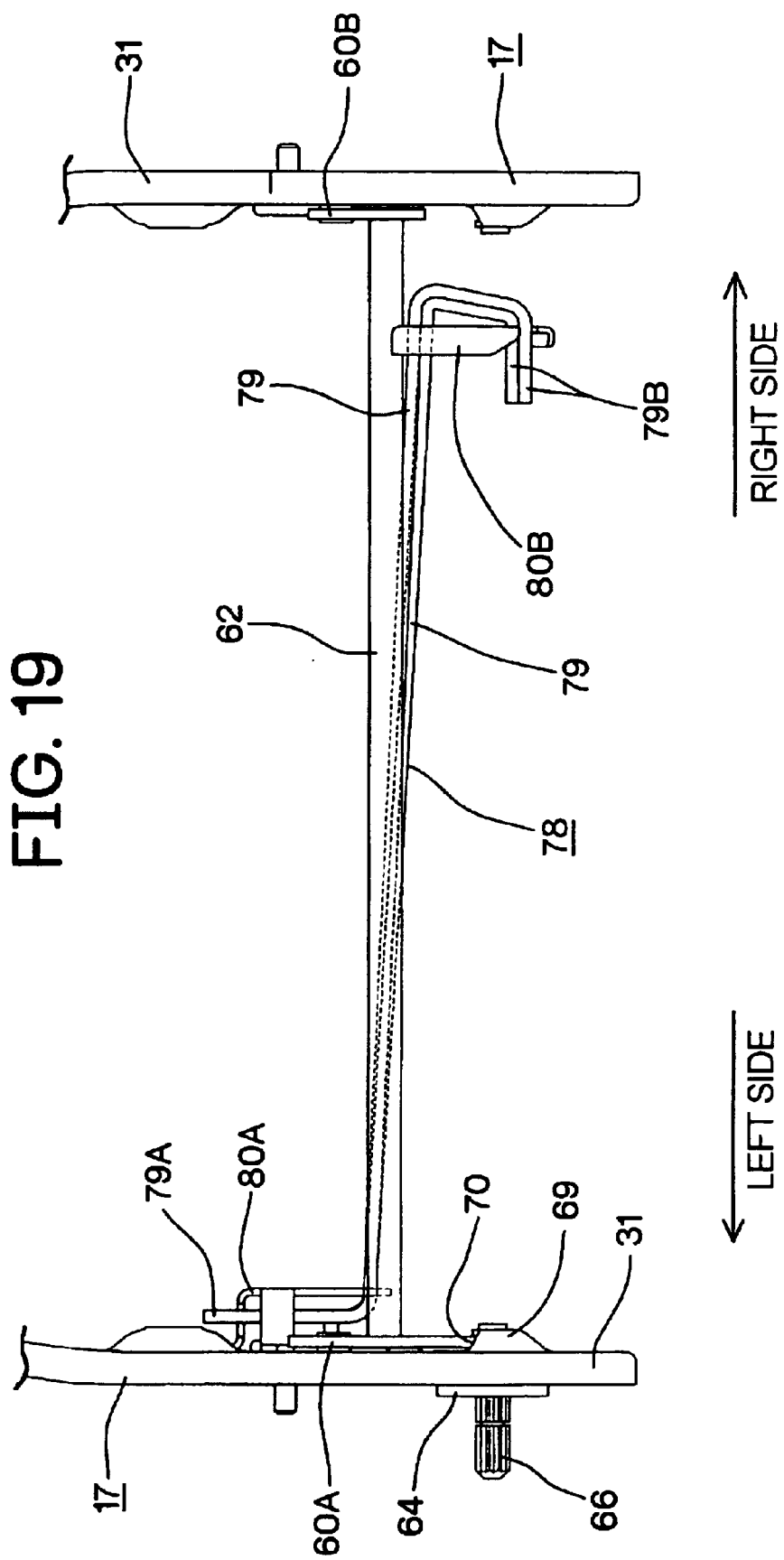
FIG. 19 is a plan view showing the state of attaching of a torsion bar spring of the height control member.

As shown in FIGS. 19 to 21, the seat bottom 12 has elastic means 78 which assists the operation for moving the seat bottom 12 upward by the height control mechanism 38. The elastic means 78 comprises two torsion bar springs 79, 79. First tip ends 79A, 79A of the springs 79, 79 are engaged with a hook member 80A fixed to the left side frame member 17, and second tip ends 79B, 79B of the springs 79, 79 are engaged with a hook member 80B fixed to the interlocking shaft 62, and consequently, the interlocking shaft 62 is urged in the counterclockwise direction in FIG. 20. The heavy seat bottom 12 to which the body weight of the driver is applied is easily moved upward with the assistance of the elasticity of the springs 79, 79.

The hook member 80B is fixed to the right portion of the interlocking shaft 62, and the distance between the hook member 80A and the hook member 80B is lengthened. The long torsion bar springs 79, 79 provided between the hook member 80A and the hook member 80B can produce a strong elasticity that counteracts the body weight of the driver. Furthermore, the fluctuation of torque of the long torsion bar springs 79, 79 becomes small. In the case of a small fluctuation of torque, a uniform rotational torque can be given to the interlocking shaft 62 regardless of the position of height of the seat bottom 12, and therefore, the fluctuation of the operating load of the operating dial 67 is made small decreased.

Figure 22:
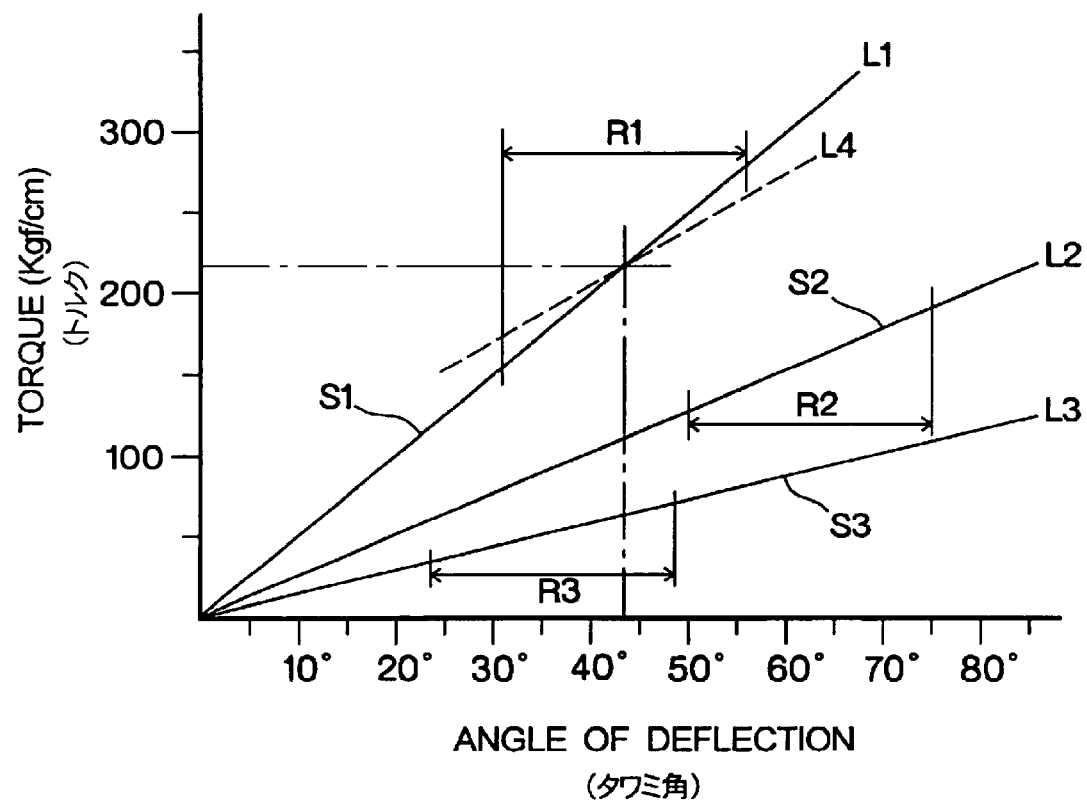
FIG. 22 is a graph view showing the relation between the angle of twist of the torsion bar spring and the torque.
Figure 23:
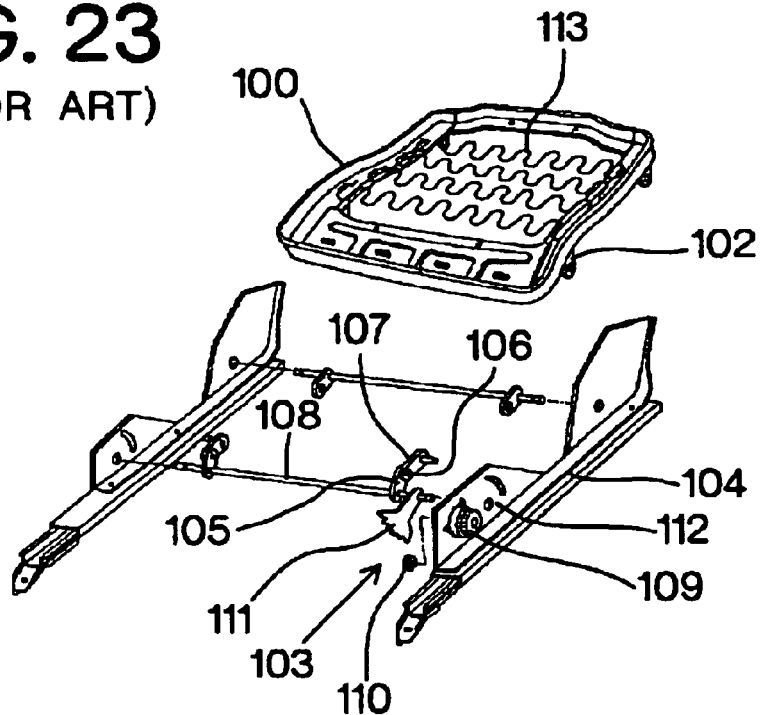
FIG. 23 and FIG. 24 are drawings of a publicly known example showing the vehicle seat disclosed in Japanese Utility Model Application Laid-Open No. 5-35458.
Figure 24:
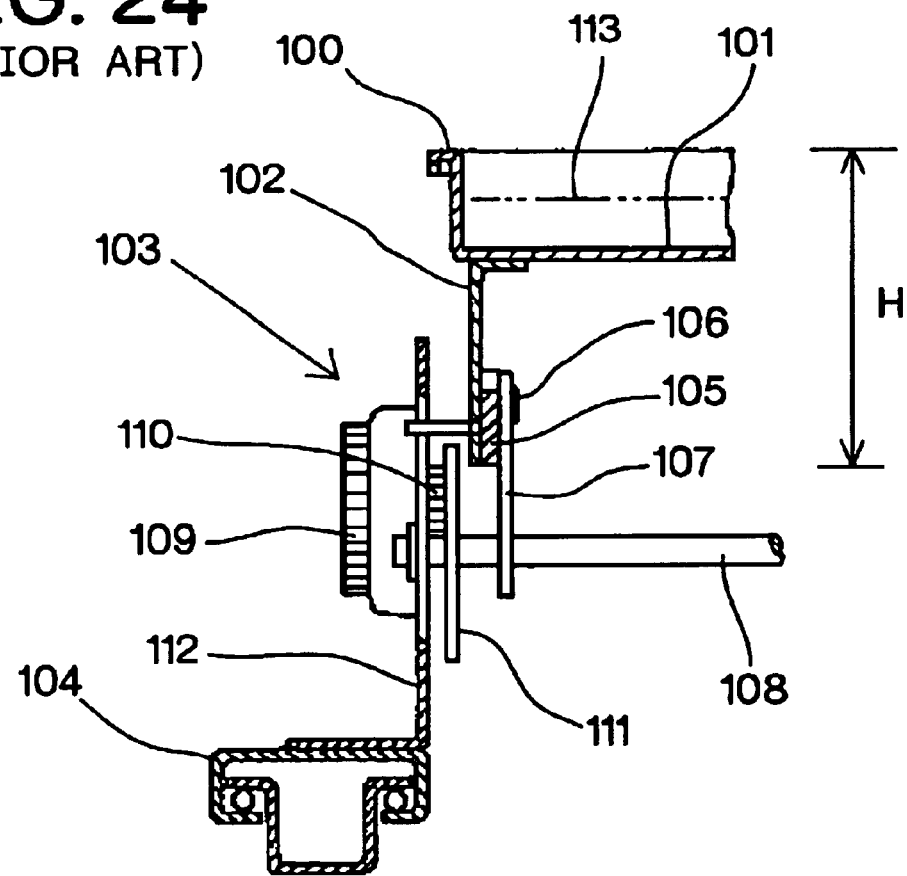

Additionally, the fluctuation of torque of the elastic means 78 is further decreased by using plural springs. In FIG. 22, the line L1 shows the torque that is obtained from a single torsion bar spring S1 with a diameter of 5 mm. In the case of the present embodiment, the interlocking shaft 62 rotates by about 25 degrees when the seat bottom 12 moves from the lowest position to the highest position. Furthermore, it is desired to give a torque of about 210 Kgf/cm to the interlocking shaft 62. The spring S1 produces a torque of about 210 Kgf/cm when twisted by about 43 degrees. However, when the spring S1 is twisted in the range R1 of about 25 degrees on the basis of about 43 degrees, the spring S1 produces a torque of a maximum of about 275 Kgf/cm to a minimum of about 150 Kgf/cm.

On the other hand, as an example, the elastic means 78 of the present invention is composed of a spring S2 of a diameter of 4 mm having the torque line L2 and a spring S3 of a diameter of 3.5 mm having the torque line L3. The spring S2 is used in the range R2 of the torsion angle of about 50 degrees to about 75 degrees, and the spring S3 is used in the range R3 of the torsion angle of about 23 degrees to about 48 degrees. The dotted line L4 shows a composite torque composed of a torque of the spring S2 in the range R2 and a torque of the spring S3 in the range R3. As clear from the comparison between the dotted line L4 and the line L1, the fluctuation of torque of the elastic means 78 that has two springs is very small.

As shown in FIGS. 2, 7, frame covers 81, 81 are respectively attached to the outer portion of the side frame members 17, 17 to cover the movable members arranged outside the side frame members 17, 17. Each cover 81 has an upright plate 82 and a bent portion 83 extending to the inside from three side edges except for the rear side edge of the upright plate 82. The bent portion 83 is positioned at the interior side of the flange 31 of the side member 17 so that the tip of the bent portion 83 does not come into contact with the cushion 28. A gently curved corner 84 between the upright plate 82 and the bent portion 83 is positioned at the outside of the tip of the flange 31 to decrease the opportunity for the cushion 28 to come into contact with the tip of the flange 31.

Several portions of the periphery of the cover 81 are dented by press working to form contact faces 85, 85 (FIGS. 11, 12). The inner curved edge 86 of the contact face 85 is connected to the upright plate 82 of the cover through a slant face 87, and the outer edge 88 of the contact face 85 becomes the end face. Therefore, it is possible to form the contact face 85 not by press working of deep-drawing whose cost is high but by normal press working. The contact face 85 is fixed to the side frame member 17 by fastening means such as a screw, a bolt, a rivet, or welding.

At the outer surface of the cover 81, an approximately U-shaped engaging rod 89 is welded. As shown in FIG. 7, a hook member 91 which is sewn onto the tip end of an outer skin 91 of the cushion 28 is engaged with the engaging rod 89. At the outer surface of the cover 81, no member is substantially provided except for the rod 89. This brings several advantages. First, the degree of freedom of the attaching position of the rod 89 increases. Second, the welding portion can be made large, and therefore, the attaching strength of the rod 89 can be enhanced. Third, the length in the back-and-forth direction of the rod 89 can be made long, and therefore, the man-hour of the attaching work of the outer skin 90 can be reduced. Fourth, the length in the back-and-forth direction of the rod 89 can be made long, and therefore, the appearance of the outer skin 90 is improved.

What is claimed is:

1. A vehicle seat comprising:
   a framework which includes a pair of left and right side frame members extending in a back-and-forth direction, a front frame member having left and right side plates fixed to front portions of the side frame members, respectively, and a rear frame member having left and right side plates fixed to rear portions of the side frame members, respectively;
   a plurality of zigzag springs positioned between the front frame member and the rear frame member, each of said zigzag springs having spring tip ends attached at middle portions between the front portions and the rear portions of the side frame members; and
   a height control mechanism arranged to move the framework up and down relative to a vehicle body;
   wherein each of said spring tip ends is provided at a position adjacent to a center line which vertically divides the side frame member, so that a distance between the spring tip end and the center line is shorter than a distance between the spring tip end and an upper edge of the side frame member.

2. The vehicle seat according to claim 1, wherein said height control mechanism has no movable member positioned between the middle portions of the side frame members.

3. The vehicle seat according to claim 1, wherein said height control mechanism comprises front and rear arms which connect the framework to the vehicle body, an elongated link which is connected to the rear arm and extends in the back-and-forth direction, and operating means that is connected to a front end of the elongated link to move the elongated link in the back-and-forth direction, and wherein said front arm, the rear arm, and the elongated link are arranged outside the side frame member.

4. The vehicle seat according to claim 3, wherein said operating means comprises an output gear which is rotated by hand and a link gear which is meshed with the output gear and is connected to the front end of the elongated link, and wherein said link gear is positioned between the front portion of the side frame member and the side plate of the front frame member.

5. The vehicle seat according to claim 4, wherein said output gear is positioned outside the side frame member, and wherein said side frame member has a window which makes it possible to mesh the output gear with the link gear.

6. The vehicle seat according to claim 4, wherein said height control mechanism further comprises elastic means which urges the link gear in a given direction, and said elastic means includes a laterally extending torsion bar spring which has a length longer than half the distance between the side frame members.

7. The vehicle seat according to claim 6, wherein said elastic means comprises two torsion bar springs.

8. The vehicle seat according to claim 7, wherein said two torsion bar springs are used in the state of producing torque different from each other.

9. The vehicle seat according to claim 3, further comprising a frame cover attached to an outer portion of the side frame members to cover the elongated link to prevent a cushion from coming into contact with the elongated link.

10. The vehicle seat according to claim 3, wherein said side frame member and said rear arm are connected to each other by caulking one end of a shaft sleeve, and the rear frame member and the side frame member are connected to each other by a bolt which is inserted into a central through hole of the shaft sleeve.

11. The vehicle seat according to claim 3, wherein said operating means comprises an output gear which is rotated by motor power and a link gear which is meshed with the output gear and is connected to the front end of the elongated link, and wherein said link gear is positioned between the front portion of the side frame member and the side plate of the front frame member.

12. The vehicle seat according to claim 11, wherein said output gear is positioned outside the side frame member, and wherein said side frame member has a window which makes it possible to mesh the output gear with the link gear.

13. The vehicle seat according to claim 11, wherein said height control mechanism further comprises elastic means which urges the link gear in a given direction, and said elastic means includes a laterally extending torsion bar spring which has a length longer than half the distance between the side frame members.

14. The vehicle seat according to claim 13, wherein said elastic means comprises two torsion bar springs.

15. The vehicle seat according to claim 14, wherein said two torsion bar springs are used in the state of producing torque different from each other.

16. A vehicle seat comprising:
a framework which includes a pair of left and right side frame members extending in a back-and-forth direction, a front frame member having left and right side plates fixed to front portions of the side frame members, respectively, and a rear frame member having left and right side plates fixed to rear portions of the side frame members, respectively; and
a height control mechanism arranged to move the framework up and down relative to a vehicle body, said height control mechanism comprising front and rear arms which connect the framework to the vehicle body, an elongated link which is connected to the rear arm and extends in the back-and-forth direction, and operating means that is connected to a front end of the elongated link to move the elongated link in the back-and-forth direction;
wherein said side frame member and said rear arm are connected to each other by caulking one end of a shaft sleeve, and the rear frame member and the side frame member are connected to each other by a bolt which is inserted into a central through hole of the shaft sleeve.

17. A vehicle seat comprising:
a framework which includes a pair of left and right side frame members extending in a back-and-forth direction, a front frame member having left and right side plates fixed to front portions of the side frame members, respectively, and a rear frame member having left and right side plates fixed to rear portions of the side frame members, respectively;
a height control mechanism arranged to move the framework up and down relative to a vehicle body, said height control mechanism comprising front and rear arms which connect the framework to the vehicle body, an elongated link which is connected to the rear arm and extends in the back-and-forth direction, and operating means that is connected to a front end of the elongated link to move the elongated link in the back-and-forth direction;
said operating means comprising an output gear which is rotated by hand and a link gear which is meshed with the output gear and is connected to the front end of the elongated link;
said height control mechanism further comprising elastic means which urges the link gear in a given direction, and said elastic means including a laterally extending torsion bar spring which has a length longer than half the distance between the side frame members.

18. The vehicle seat according to claim 17, wherein said elastic means comprising two torsion bar springs.

19. The vehicle seat according to claim 18, wherein said two torsion bar springs are used in the state of producing torque different from each other.

20. A vehicle seat comprising:
a framework which includes a pair of left and right side frame members extending in a back-and-forth direction, a front frame member having left and right side plates fixed to front portions of the side frame members, respectively, and a rear frame member having left and right side plates fixed to rear portions of the side frame members, respectively;
a height control mechanism arranged to move the framework up and down relative to a vehicle body, said height control mechanism comprising front and rear arms which connect the framework to the vehicle body, an elongated link which is connected to the rear arm and extends in the back-and-forth direction, and operating means that is connected to a front end of the elongated link to move the elongated link in the back-and-forth direction;

said operating means comprising an output gear which is rotated by motor power and a link gear which is meshed with the output gear and is connected to the front end of the elongated link;

said height control mechanism further comprising elastic means which urges the link gear in a given direction, and said elastic means including a laterally extending torsion bar spring which has a length longer than half the distance between the side frame members.

21. The vehicle seat according to claim 20, wherein said elastic means comprising two torsion bar springs.

22. The vehicle seat according to claim 21, wherein said two torsion bar springs are used in the state of producing torque different from each other.

* * * * *